US010757057B2

(12) United States Patent
Friend et al.

(10) Patent No.: US 10,757,057 B2
(45) Date of Patent: Aug. 25, 2020

(54) MANAGING CONVERSATIONS (71) Applicant: MICROSOFT TECHNOLOGY LICENSING, LLC, Redmond, WA (US)

(72) Inventors: Ned Bearer Friend, Seattle, WA (US); Matthias Baer, Seattle, WA (US); Nicholas Smith, Redmond, WA (US); Trevor Neil Lacey, Sammammish, WA (US); Peter Loren Engrav, Seattle, WA (US); Michael Borysenko, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 368 days.

(21) Appl. No.: 15/409,493

(22) Filed: Jan. 18, 2017

(65) Prior Publication Data

US 2017/0126608 A1 May 4, 2017

Related U.S. Application Data

(63) Continuation of application No. 14/054,625, filed on Oct. 15, 2013, now abandoned.

(51) Int. Cl.
*G06F 3/0488* (2013.01)
*H04L 12/58* (2006.01)
(Continued)

(52) U.S. Cl.
CPC ............ *H04L 51/22* (2013.01); *G06F 3/0482* (2013.01); *G06F 3/0486* (2013.01); *G06F 3/0488* (2013.01); *H04L 51/16* (2013.01)

(58) Field of Classification Search
CPC .... G06F 3/0482; G06F 3/0486; G06F 3/0488; G06F 3/04892; H04L 51/16; H04L 51/22
See application file for complete search history.

(56) References Cited

U.S. PATENT DOCUMENTS 6,964,025 B2   11/2005  Angiulo et al.
7,444,598 B2   10/2008  Horvitz et al.
(Continued)

FOREIGN PATENT DOCUMENTS

| CN | 102592214 A | 7/2012 |
| CN | 103210371 A | 7/2013 |
| WO | 2008033648 A1 | 3/2008 |

OTHER PUBLICATIONS

Andrew Legrand, Use Boomerang to Make Your Email Vanish, but Return When You Need It, pp. 1-3. (Year: 2012).*

(Continued)

*Primary Examiner* — Tan H Tran
(74) *Attorney, Agent, or Firm* — Michael Best & Friedrich LLP (57) ABSTRACT

Technologies are generally described for providing a system to facilitate efficient management and prioritization of conversations, such as emails, in a communication application. Conversations may be prioritized according to user preferences, and an inbox may be rearranged to display important conversations in a user defined order. Conversations may also be associated together so that they may appear together and flow together in the inbox. Additionally, the system may enable a user to delay display of a conversation until a later time based on various criteria such as location, time, and client device. A user may also move important emails to the top of an inbox for prominent display. The system may perform the actions automatically based on observed user behavior. Furthermore, the system may enable touch interactions for interacting with and managing the conversations, and quick controls may be provided for executing commands to perform actions associated with the conversations.

19 Claims, 10 Drawing Sheets

(51) Int. Cl.
*G06F 3/0482* (2013.01)
*G06F 3/0486* (2013.01)

(56) References Cited

U.S. PATENT DOCUMENTS

| | | |
|---|---|---|
| 7,496,830 B2 | 2/2009 | Rubin et al. |
| 7,506,263 B1 | 3/2009 | Johnston et al. |
| 7,970,771 B2 | 6/2011 | Rasmussen et al. |
| 8,028,032 B2 | 9/2011 | Laird-McConnell |
| 8,065,369 B2 | 11/2011 | Turski et al. |
| 8,090,779 B2 | 1/2012 | Ludwig et al. |
| 8,135,617 B1 | 3/2012 | Agostino et al. |
| 8,136,051 B2 | 3/2012 | Friedlander et al. |
| 8,205,172 B2 | 6/2012 | Wong et al. |
| 8,782,538 B1 | 7/2014 | Skare et al. |
| 9,049,261 B2 | 6/2015 | Shiplacoff et al. |
| 2004/0003351 A1 | 1/2004 | Sommerer et al. |
| 2004/0073616 A1 | 4/2004 | Fellenstein et al. |
| 2004/0205514 A1 | 10/2004 | Sommerer et al. |
| 2004/0267700 A1 | 12/2004 | Dumais et al. |
| 2005/0144573 A1 | 6/2005 | Moody et al. |
| 2006/0123360 A1 | 6/2006 | Anwar et al. |
| 2006/0203620 A1* | 9/2006 | Bedingfield, Sr. ... G06Q 10/109 368/247 |
| 2006/0224997 A1 | 10/2006 | Wong et al. |
| 2007/0156826 A1* | 7/2007 | Lu .................. G06Q 10/107 709/206 |
| 2007/0264948 A1 | 11/2007 | Jansson et al. |
| 2008/0043943 A1 | 2/2008 | Sipher et al. |
| 2008/0126951 A1* | 5/2008 | Sood .................. G06Q 10/107 715/752 |
| 2008/0171535 A1 | 7/2008 | Carmody et al. |
| 2008/0201437 A1 | 8/2008 | Ludwig et al. |
| 2008/0235335 A1* | 9/2008 | Hintermeister ....... G06Q 10/107 709/206 |
| 2008/0270560 A1 | 10/2008 | Tysowski et al. |
| 2009/0042542 A1 | 2/2009 | Dias |
| 2009/0089382 A1* | 4/2009 | Garrett .................. G06F 15/16 709/206 |
| 2009/0106674 A1 | 4/2009 | Bray et al. |
| 2009/0271486 A1* | 10/2009 | Ligh ................. G06F 3/04886 709/206 |
| 2009/0327883 A1 | 12/2009 | Robertson et al. |
| 2009/0327972 A1 | 12/2009 | McCann et al. |
| 2010/0064017 A1 | 3/2010 | Buchheit et al. |
| 2010/0088376 A1 | 4/2010 | Kunz et al. |
| 2010/0131523 A1 | 5/2010 | Yu et al. |
| 2010/0162138 A1 | 6/2010 | Pascal et al. |
| 2010/0162174 A1 | 6/2010 | Karidi et al. |
| 2010/0169264 A1 | 7/2010 | O'Sullivan et al. |
| 2010/0169826 A1 | 7/2010 | Keereepart et al. |
| 2010/0273457 A1 | 10/2010 | Freeman et al. |
| 2011/0004831 A1 | 1/2011 | Steinberg et al. |
| 2011/0072363 A1 | 3/2011 | Mandel et al. |
| 2011/0145353 A1 | 6/2011 | Yuyama |
| 2011/0145698 A1 | 6/2011 | Penov et al. |
| 2011/0145744 A1 | 6/2011 | Haynes et al. |
| 2011/0173210 A1 | 7/2011 | Ahn et al. |
| 2011/0231499 A1 | 9/2011 | Stovicek et al. |
| 2011/0280476 A1 | 11/2011 | Berger et al. |
| 2012/0047460 A1 | 2/2012 | Mccann |
| 2012/0109836 A1 | 5/2012 | Chen et al. |
| 2012/0131474 A1 | 5/2012 | Panchadsaram et al. |
| 2012/0158843 A1 | 6/2012 | Angani et al. |
| 2012/0185797 A1 | 7/2012 | Thorsen et al. |
| 2012/0191716 A1 | 7/2012 | Omoigui |
| 2012/0233531 A1 | 9/2012 | Ma et al. |
| 2012/0272160 A1 | 10/2012 | Spivack et al. |
| 2013/0066984 A1 | 3/2013 | Shin |
| 2013/0091465 A1 | 4/2013 | Kikin-gil et al. |
| 2013/0110815 A1 | 5/2013 | Tankovich et al. |
| 2013/0110940 A1* | 5/2013 | Pasquero .......... H04M 1/72552 709/206 |
| 2013/0125063 A1 | 5/2013 | Lee et al. |
| 2013/0205187 A1 | 8/2013 | Hawkins |
| 2013/0218897 A1 | 8/2013 | Palay |
| 2013/0262438 A1 | 10/2013 | Palay |
| 2013/0262605 A1 | 10/2013 | Buchheit et al. |
| 2013/0328665 A1* | 12/2013 | Cranfill ................. G06Q 10/109 340/7.55 |
| 2014/0067974 A1* | 3/2014 | Lewinson ............... H04L 51/30 709/206 |
| 2014/0082521 A1 | 3/2014 | Carolan et al. |
| 2014/0229270 A1 | 8/2014 | Rashwan |
| 2014/0281895 A1 | 9/2014 | Tay et al. |
| 2014/0304613 A1* | 10/2014 | Coe ..................... G06F 3/04842 715/752 |
| 2015/0032692 A1 | 1/2015 | Litzenberger |
| 2015/0032829 A1* | 1/2015 | Barshow ................. H04L 51/16 709/206 |
| 2015/0082189 A1 | 3/2015 | Baer et al. |
| 2015/0095088 A1* | 4/2015 | Dabbiru ............ G06Q 10/1095 705/7.19 |
| 2015/0106740 A1 | 4/2015 | Tan et al. |
| 2015/0106741 A1 | 4/2015 | Friend et al. |
| 2015/0143211 A1 | 5/2015 | Kaufthal et al. |
| 2015/0186366 A1 | 7/2015 | Yan et al. |
| 2015/0186381 A1 | 7/2015 | Yan et al. |
| 2015/0220500 A1 | 8/2015 | Katic |
| 2016/0147782 A1* | 5/2016 | Roseman ................. G06F 16/16 707/822 |
| 2017/0308545 A1 | 10/2017 | Soni |

OTHER PUBLICATIONS

"Mac iWork Pages: How Can I Create Internal Links?", Retrieved From: http://superuser.com/questions/235001/mac-work-pages-how-can-i-create-internal-links, Jan. 19, 2011, 2 Pages.

"Pages for iOS (iPhone, iPod touch): Hyperlink Text in a Document", Retrieved From: http://support.apple.com/kb/PH3581, Sep. 26, 2012, 2 Pages.

"Final Office Action Issued in U.S. Appl. No. 14/032,151", dated Apr. 14, 2016, 15 Pages.

"Final Office Action Issued in U.S. Appl. No. 14/032,151", dated Dec. 2, 2016, 15 Pages.

"Non-Final Office Action Issued in U.S. Appl. No. 14/032,151", dated Feb. 23, 2017, 14 Pages.

"Non-Final Office Action Issued in U.S. Appl. No. 14/032,151", dated Oct. 21, 2015, 16 Pages.

Zhu et al., "Context-Aware Informative Display", In IEEE International Conference on Multimedia and Expo, Jul. 2, 2007, 4 Pages.

"Non-Final Office Action Issued in U.S. Appl. No. 14/032,151", dated Jul. 28, 2016, 15 Pages.

Weverka P., "Microsoft OneNote 2010 Plain & Simple", By Microsoft Press, Sep. 27, 2011, 8 Pages.

"Final Office Action Issued in U.S. Appl. No. 14/082,479", dated May 26, 2016, 20 Pages.

"Non-Final Office Action Issued in U.S. Appl. No. 14/082,479", dated Oct. 13, 2015, 16 Pages.

"European Communication Issued in European Patent Application No. 14809179.6", dated Jul. 1, 2016, 2 Pages.

"Non Final Office Action Issued in U.S. Appl. No. 15/134,819", dated May 31, 2018, 34 Pages.

"First Office Action and Search Report Issued in Chinese Patent Application 201480062988.2", dated Sep. 13, 2018, 13 Pages.

Ali, et al., "Adaptive Layout for Interactive Documents", In Proceedings of the 9th International Symposium on Smart Graphics, Aug. 27, 2008, 8 Pages.

Bhaowal Mayukh, "Bringing Links to Life with Link Preview", Retrieved From: http://yahoomail.tumblr.com/post/79395405926/bringing-links-to-life-with-link-preview, Mar. 12, 2014, 5 Pages.

Gaskell, et al., "Creating a Link?", Retrieved From: https://confluence.atlassian.com/display/CONF30/Rich+Text-Creating+and+removing+a+link, Jun. 16, 2009, 2 Pages.

Lardinois, Frederic, "Google Drive Gets Updated Link Tool for Docs and Slide with Integrated Google Search", Retrieved From: https://techcrunch.com/2013/08/06/google-drive-gets-updated-link-tool-for-docs-and-slide-with-integrated-google-search/, Aug. 6, 2013, 2 Pages.

(56) References Cited

OTHER PUBLICATIONS

Ma, Francis, "Deep Linking from Mobile Apps", Retrieved From: https://web.archive.org/web/20130827100418/http://www.googblogs.com/uncategorized/deep-linking-from-mobile-apps/, Aug. 27, 2013, 3 Pages.
"International Search Report and Written Opinion Issued in PCT Application No. PCT/US2014/055970", dated Apr. 13, 2015, 8 Pages.
"International Preliminary Report on Patentability Issued in PCT Application No. PCT/US2014/065593", dated Jan. 27, 2016, 7 Pages.
"International Search Report and Written Opinion Issued in PCT Patent Application No. PCT/US2014/065593", dated Mar. 6, 2015, 10 Pages.
"Second Written Opinion Issued in PCT Application No. PCT/US2014/065593", dated Sep. 24, 2015, 5 Pages.
"International Search Report and Written Opinion Issued in PCT Application No. PCT/US2017/026884", dated May 31, 2017, 12 Pages.
Taylor, Tiffany, "Introducing Rich Link Preview", Retrieved From: https://web.archive.org/web/20150914234220/http://blog.socialcast.com/introducing-rich-link-preview/, Nov. 15, 2012, 3 Pages.
"Final Office Action Issued in U.S. Appl. No. 14/054,625", dated Nov. 6, 2015, 26 Pages.
"Final Office Action Issued in U.S. Appl. No. 14/054,625", dated Oct. 19, 2016, 25 Pages.
"Non Final Office Action Issued in U.S. Appl. No. 14/054,625", dated Jun. 17, 2015, 35 Pages.
"Non Final Office Action Issued in U.S. Appl. No. 14/054,625", dated May 18, 2016, 24 Pages.
Banks, Emmanuel, "Mailbox Review: The Best Email Client Ever—Lifehack", Retrieved from <<http://www.lifehack.org/articles/technology/mailbox-review-transforms-your-email-inbox-into-a-to-do-list.html>>, Feb. 15, 2013, 12 Pages.
Fisher, Jon, "View and Organize Multiple Email Accounts Like Never Before with ALTO Mail", Retrieved from <<http://www.technorms.com/28959/organize-multiple-email-accounts-with-alto-mail>>, Jun. 25, 2013, 10 Pages.
"International Search Report & Written Opinion Issued in PCT Application No. PCT/US2014/059990", dated Apr. 16, 2015, 11 Pages.
Rao, Leena, "Handle is a Priority Engine and Task Management App for Your Inbox", Retrieved from <<https://techcrunch.com/2013/04/29/handle-is-a-priority-engine-and-task-management-app-for-your-inbox/>>, Apr. 29, 2013, 6 Pages.
Siu, et al., "Going with the Flow: Email Awareness and Task Management", In Proceedings of 20th Anniversary Conference on Computer Supported Cooperative Work, Nov. 4, 2006, 10 Pages.
Terdiman, Daniel, "Pigs Fly: AOL's New E-mail Client Makes Inboxes a Happy Place", Retrieved from <<https://www.cnet.com/news/pigs-fly-aols-new-e-mail-client-makes-inboxes-a-happy-place/>>, Oct. 18, 2012, 8 Pages.
Whittaker, et al., "Am I Wasting My Time Organizing Email? A Study of Email Refinding", In Proceedings of the SIGCHI Conference on Human Factors in Computing Systems, May 7, 2011, 10 Pages.
"Office Action Issued in Chinese Patent Application No. 201480056900.6" dated Nov. 23, 2018, 5 Pages.
Final Office Action Issued in U.S. Appl. No. 15/134,819 dated Nov. 19, 2018, 28 Pages.
Baer, et al., "Providing Visualizations For Conversations", US Patent Application filed Sep. 19, 2013, 1 Page.
"Search Report Issued in European Patent Application No. 14787368.1", dated May 11, 2017, 8 Pages.
"First Office Action and Search Report Issued in Chinese Patent Application No. 201480056900.6", dated Mar. 14, 2018, 17 Pages.
"Office Action Issued in European Patent Application No. 14787368.1", dated Apr. 5, 2019, 5 Pages.
"Non Final Office Action Issued in U.S. Appl. No. 15/134,819", dated Apr. 26, 2019, 28 Pages.
"Final Office Action Issued in U.S. Appl. No. 15/134,819", dated Oct. 31, 2019, 32 Pages.
"Non-Final Office Action Issued in U.S. Appl. No. 15/134,819", dated Mar. 19, 2020, 32 Pages.
"Summons to Attend Oral Proceedings Issued in European Patent Application No. 14787368.1", dated Mar. 25, 2020, 8 Pages.

* cited by examiner

MANAGING CONVERSATIONS

CROSS-REFERENCE TO RELATED APPLICATION

This application is a continuation under 35 U.S.C. § 120 of co-pending U.S. patent application Ser. No. 14/054,625 filed on Oct. 15, 2013. The disclosure of the U.S. Patent Application is hereby incorporated by reference in its entirety.

BACKGROUND

Communication applications are widely used on u variety of client devices for real time and non-real time correspondence. With the proliferation of computing and networking technologies, communications including email use, video conferencing and instant messaging have become an inextricable part of daily personal and professional lives. The increased reliance on email brings with it the disadvantage of how to deal with increasingly large numbers of email. It is a common occurrence to find hundreds of email needing attention (at least a quick review) when a person comes back from vacation or comparable absence. Similarly, certain events (e.g., a product release, a conference, etc.) may generate a large number of received emails when the person receiving the emails may be too busy to deal with the Increased volume. In addition to important emails, users may receive personal emails and junk email in a same inbox creating even more conversations to sort through.

Users may receive a large quantity of emails hourly and daily, and sorting through hundreds and even thousands of emails to find important emails that need to be dealt with can be arduous, inefficient, and time consuming. Spending a significant time going through emails can be stressful and overwhelming, and users may feel that it is difficult to catch up and read through everything to find and keep track of important emails and to efficiently manage emails.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to a system facilitating efficient management and prioritization of conversations, such as emails, in a communication application. Conversations may be prioritized according to user preferences, and an inbox may be rearranged to display important conversations in a user-defined order. For example, a user may be enabled to move important emails to the top of an inbox for prominent display. Conversations may also be associated together so that they may flow together in the inbox. Additionally, the system may enable a user to hide or minimize display of a conversation until a later time based on criteria such as location, time, proximity to other people, and client device. The system may also be configured to perform the actions automatically based on observed user behavior.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, a system is described for managing conversations in a communication application. A user may prioritize emails and rearrange an inbox according to user preferences to display important conversations In a preferred order. A user may mark a message as important and move the marked message to the top of the inbox. Conversations may also be stacked together so that they may appear together and flow together in the inbox. Some actions may be performed automatically based on observed user behavior. Touch interactions may also be employed for interacting with and managing the conversations and quick controls may be provided for executing commands to perform actions associated with the conversations.

In the following detailed description, references are made to the accompanying drawings that form a pan hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or us an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flush drive, a floppy disk, or compact servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Throughout this specification, the term "platform" may be a combination of software and hardware components tor providing a system to facilitate management of conversations in a communication application. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

According to embodiments, a client device may be a touch or gesture-enabled device, such that hand gestures and linger touch may be recognized as input methods on the user interface of the client device for interacting with, controlling, and providing content to the client device. The client device may also work with a traditional mouse and keyboard. A touch or gesture-enabled device may recognize touch actions such as a top, a swipe, a pinch, expand, and a drag, as some examples. Touch actions, such a tap, swipe, pinch, expand, and drag, and other similar actions as used herein may be provided by a user through a finger, a pen, a mouse, or similar device, as well as through predefined keyboard entry combinations, a voice command, or an eye-tracking input.

Figure 1:
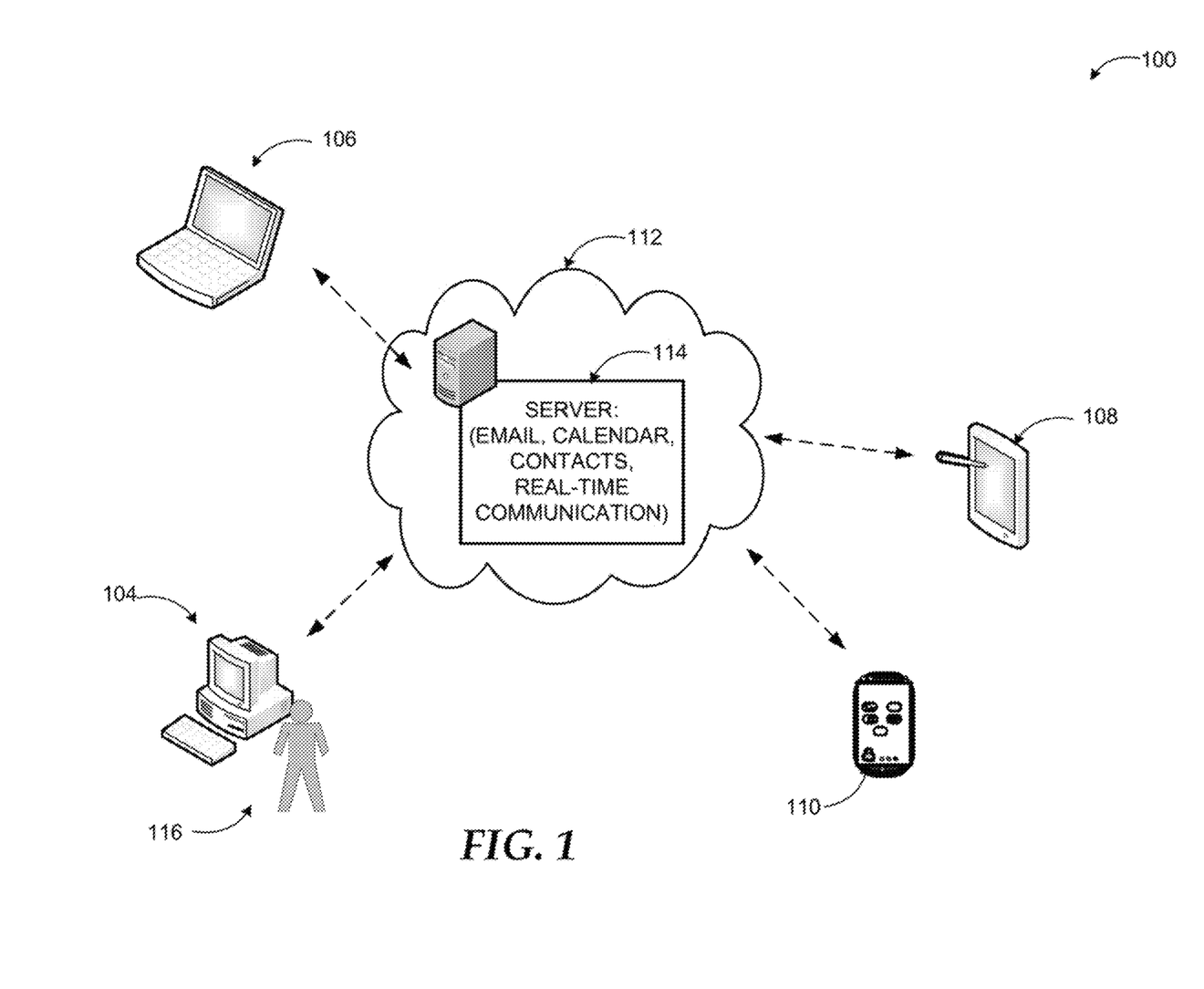
FIG. 1 illustrates an example collaborative environment where a system for managing conversations on a client device may be employed.

FIG. 1 illustrates an example collaborative environment, where a system for managing conversations on a client device may be employed. In a collaborative environment, as demonstrated in diagram 100, a user 116 may employ a variety of different client devices to communicate with other users. For example, a communication application executed on the client devices may enable email exchange, instant messaging, voice over IP (VOIP), audio and video conferencing, and phone calls. The communication application may be executed on the client device, and may be connected with a server 114 and with other client devices over a network 112. The network 112 may be a wired or wireless network, or a cloud network. The server 114 providing the communications through the communication application may also provide other features accessible at the client devices over the network such as calendar applications, word processing applications, contacts management, and presence detection. The communication application and other applications may be integrated together to enable the applications to communicate with each other to exchange information for seamless coordination of communicating, collaborating, and information exchange.

Some example client devices for viewing emails may include a desktop computing device 104, a personal computer 106, a tablet 108, a smartphone 110, a whiteboard and other similar client devices. The client devices may be configured to enable touch and gesture interaction, such that the user 116 may interact with a document, or a conversation such as an email, viewed on the user's client device employing touch and gesture actions on the user interface of the client device.

In some example embodiments, a large quantity of emails and conversations may be received daily at a communication application. Example entails may include important business and personal emails, as well as less important emails, which may include shopping, news, entertainment, recreational, and other low importance emails. Other conversations may include emails to schedule meetings and conference calls, and to share documents. When the user 116 receives a large quantity of emails, the user 116 may need to be able to quickly sort through the user's inbox to quickly find, view, and reply to important emails.

In some scenarios, the communication application may be configured 10 display conversations, such as emails, in different configurations based on the type of computing device for optimizing how a user views and interacts with emails on the computing device. For example, a personal computer or desktop device may have more viewing space on the user interface such that a larger quantity of emails may be viewed at a time, as well as some detailed preview information about an email may be provided. A tablet or smartphone, however, may have a smaller user interface and thus more limited viewing space for displaying emails. Because of a smaller user interface, fewer emails may be displayed on an email application executed on a smart phone or tablet, and when the user 116 views emails on a tablet or smartphone, it may be even more difficult to parse through a large quantity of unread and unsorted emails quickly and efficiently. A user may desire to efficiently organize displayed conversations such that important conversations may be displayed, and other non-important conversations may be hidden until a later time.

A system according to embodiments may enable efficient management of conversations in the communication application. The system may enable conversations to be prioritized and an inbox to be reorganized to display important conversations in a desired order according to user preferences. The system may also enable conversations to be associated together so that they may be viewed together and may flow together on the user interface. Additionally, the system may enable a user to hide a conversation until a later time based on various criteria such as location, time, proximity to other people, and client device. The system may also enable a user to move important emails to the top of an inbox for prominent display. Furthermore, the system may enable touch and gesture interactions for interacting with the conversations to organize and prioritize conversations, and may provide quick touch controls for executing commands on an interface of the client device.

Figure 2A:
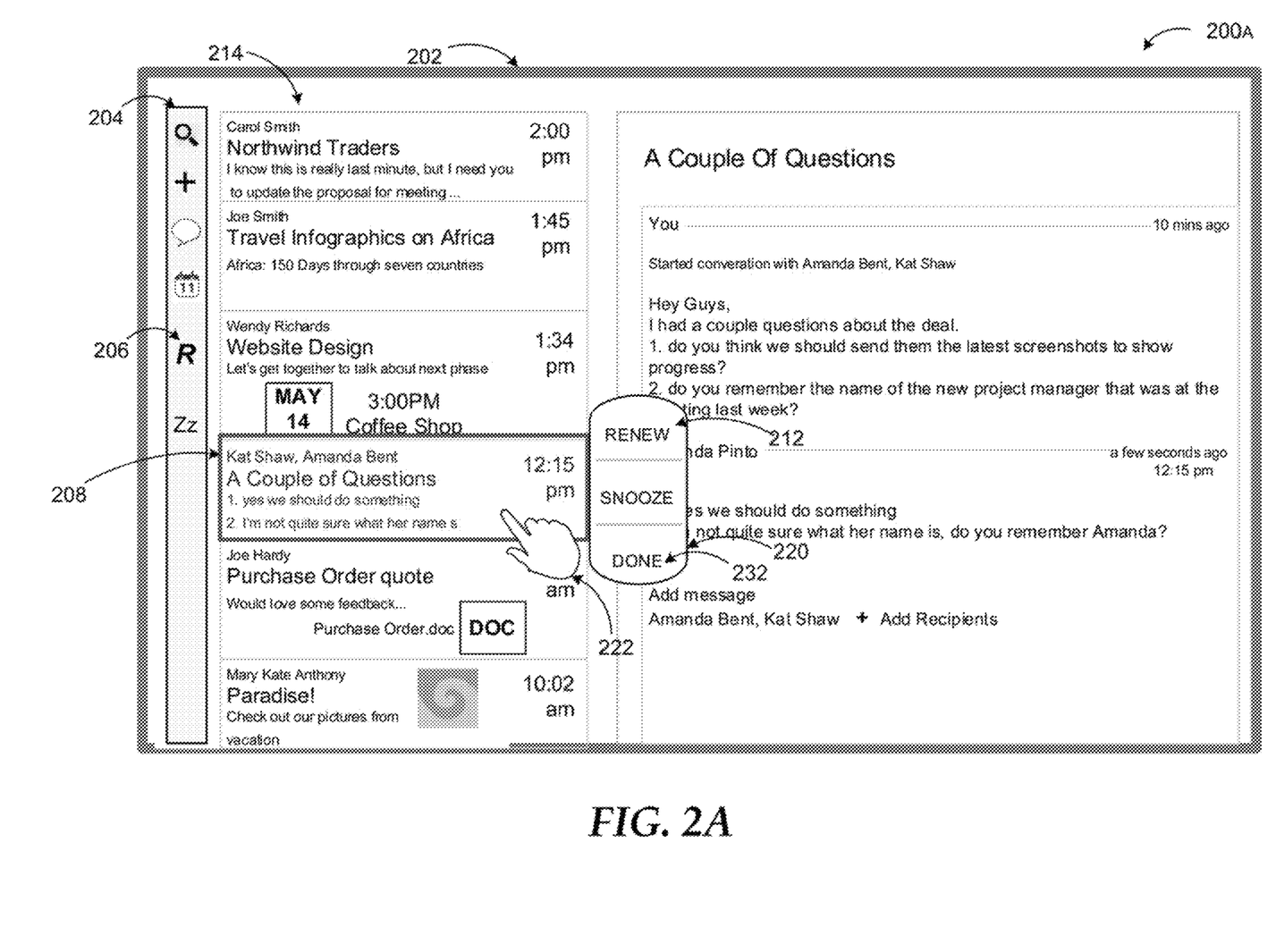
FIGS. 2A and 2B illustrate an example renew action of a communication application.
Figure 2B:
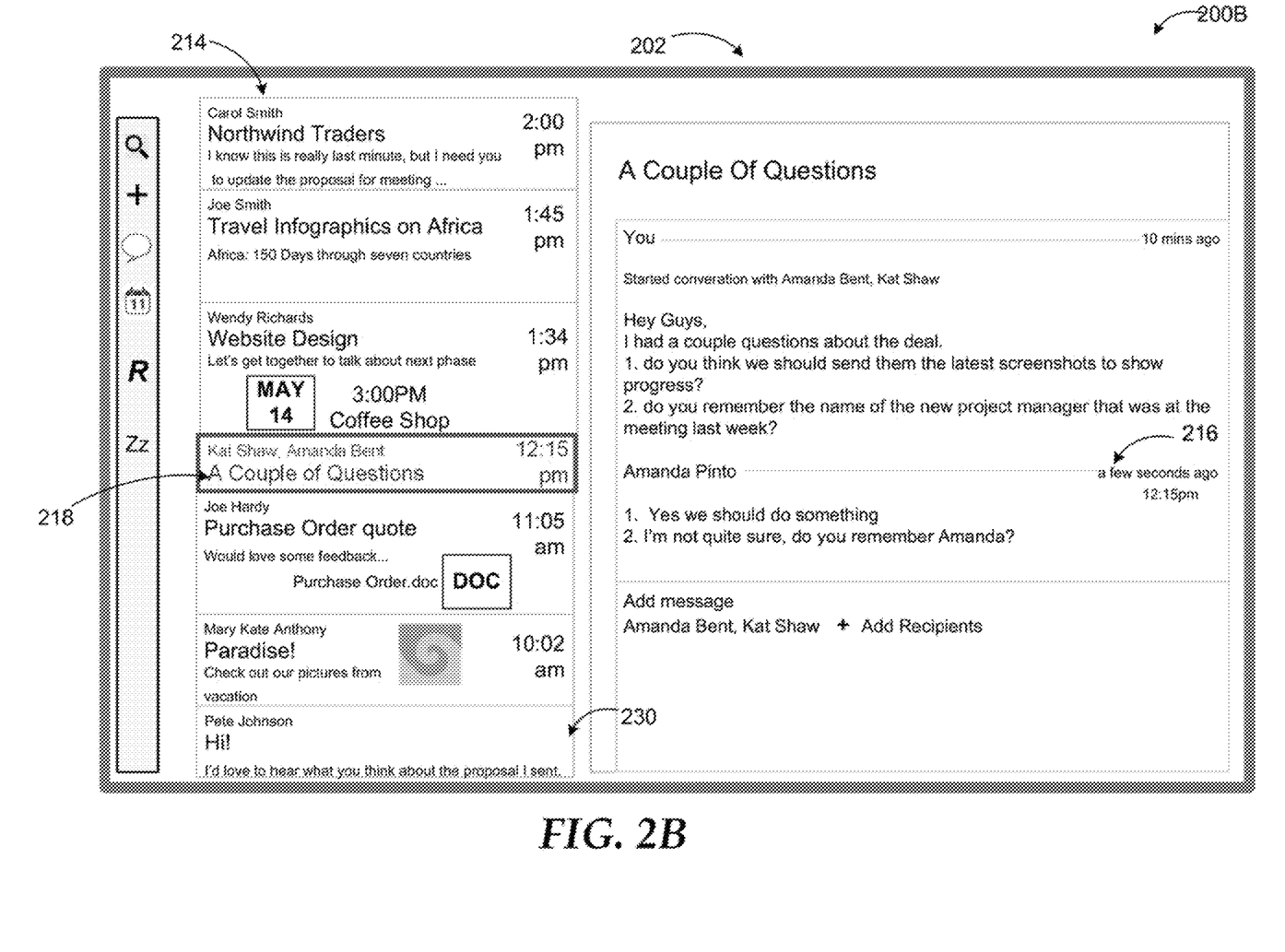

FIGS. 2A and 2B illustrate an example renew action of a communication application, according to some example embodiments.

As previously described, a communication application 202 may display a large quantity of conversations, such as emails, in an inbox 214. The conversations may include important work and personal emails, as well as less important emails such as entertainment and spam emails. A user may desire to view certain emails at certain times. For example, the user may desire to view work emails only during business hours or while at the office, and to receive personal and entertainment emails when at home and during evening non-business hours. Additionally, a user may desire to keep track of important messages. In some communication applications 202, a user may mark a message as important, such as with a red flag, and the user may scan the inbox 214 to look for the mark in order to find it again. Marked emails may be forgotten and/or lost as new messages are received, and the marked email moves further down a list of received messages in the inbox 214.

As illustrated in diagrams 200A and 200B, a system according to embodiments may enable a user to keep track of important messages by moving an important message to the top of the inbox 214 utilizing a renew action. The renew action may move the conversation to appear at the top of the inbox 214. In some cases, the renewed conversation may be made new again, or marked as unread, and in other cases, the renewed conversation may be moved to the top of the inbox 214 while maintaining a read state. Additionally, when the renewed conversation is moved to the top of the inbox 214, the conversation may be flagged to indicate that it was renewed. The renewed conversation may preserve an original timestamp so that the user knows when the conversation first arrived or was first initiated, and the renewed conversation may also receive an additional timestamp for when it is moved to the top of the inbox 214.

In some embodiments, the renewed conversation may continue to flow with other conversations in the inbox 214 as new conversations are received, and the renewed conversation may be renewed subsequent times to keep the conversation at the top of the inbox 214 as many times as a user desires. In effect, the renew action may mimic forwarding the conversation to the user's own inbox in order to move the conversation to the top of the inbox 214. However, the senders and recipients may remain the same when the conversation is renewed, unlike when the user forwards to himself and the user becomes the sender. The renewed conversation may also preserve original header and body without insertion of additional forwarding headers that are sometimes inserted when a conversation is forwarded. In another embodiment, the renewed conversation may be configured to remain at the top of the inbox for a period of time such that the renewed conversation may not to flow with other conversations in the inbox 214 as new conversations are received. The user may actively remove the renewed conversation from the top of the inbox 214 to enable the conversation to continue to flow with other conversations in the inbox. Additionally, the renewed conversation may remain at the top of the inbox for a predefined and customizable amount of time, and at the expiration of the period of time, the conversation may continue to flow with other conversations in the inbox.

In an example embodiment, as illustrated in diagram 200A, a user may select a message 208 from an inbox 214 list of messages that the user may desire to renew. For example, the user may desire to renew the message 208 if the user does not have time to read it currently, if the user wants to mark the message 208 for later follow up, if the user wants to keep the message 208 near the top of the inbox 214 as a reminder, or other similar scenario. The user may select the message 208 employing a touch action 222 such as a tap and hold, a horizontal swipe, or another swipe motion in a shape such as an L-shape, and a popup pane 220 may appear with a list of selectable actions to be executed on the selected message. The renew action 212 may be presented on the list of actions on the popup pane 220, and the user may perform a gesture to select the renew action 212. An example gesture may be to drag the message over the renew action 212 or to tap the renew action 212 while the message is selected. Other traditional input actions such as mouse, stylus and keyboard entries may also be utilized to select to renew the message.

As illustrated in diagram 200B, after the renew action has been selected to renew the selected message, the renewed message 230 may be moved to the top of the inbox 214 list. The renewed message 230 may receive a new timestamp 218 to indicate when the message was renewed, and the original timestamp 216 may be preserved to indicate when the message was originally received. The renewed message 230 may also be marked as important with a visualization icon such as a star or flag so that as the renewed message flows with the messages in the inbox 214, the user can quickly scan and identify the renewed message in the inbox 214. A filter may also be provided to enable the user to select to view only renewed items in the inbox.

In another example embodiment, a toolbar 204 may be provided with the communication application 202 to enable quick actions to be taken. A renew option may be presented on the toolbar 204, and the user may select the message to renew the message and perform an input action to select the renew action from the toolbar 204. For example, the user may tap and hold the message to select the message, and may drag and drop the message over the renew action, or the user may tap the renew action on the toolbar 204 while the message is selected to renew the message.

In a further embodiment, the communication application 208 may be configured to automatically renew a message based on identified user behavior. For example, the system may automatically renew a message after a user begins a draft reply. The system may also automatically renew a message after the user begins reading the message. The system may detect reading of the message based on the user interaction with the message such as scrolling through the message through touch action 222 or moving a scrollbar in the reading pane of the message or detecting the user's eye lingering for a period of time on the message through eye detection. In another example, the system may automatically renew a message if an expected reply is not received. For example, the system may reason over content of the message to determine that a reply is likely expected, and then if no reply is received within a defined period of time, e.g. 48 hours, the message may be automatically renewed in the inbox 214 to remind the user to follow up. Furthermore, since a new timestamp may be received when a message is renewed, the system may enable sorting emails based on original timestamps and on renewed timestamps that may be received when a user modifies or renews a message.

In another example embodiment, a done action 232 may also be provided, where the user may select the done action 232 after interacting with a message to hide the message from the inbox 214 so that other important emails may be displayed. The user may mark a message as done by dragging the message to the done action 232 displayed on the popup pane 220, selecting the done action on the popup pane 220 while the message is selected, performing a swipe in a particular shape such as an L-shape, or by selecting a quick done action from the toolbar 204. The system may also automatically mark messages as done, for example after the user replies to a message, reads a message when a reply is not expected, or downloads attachments from a message. When the message is automatically marked as done, the message may be hidden from the inbox 214.

Figure 3A:
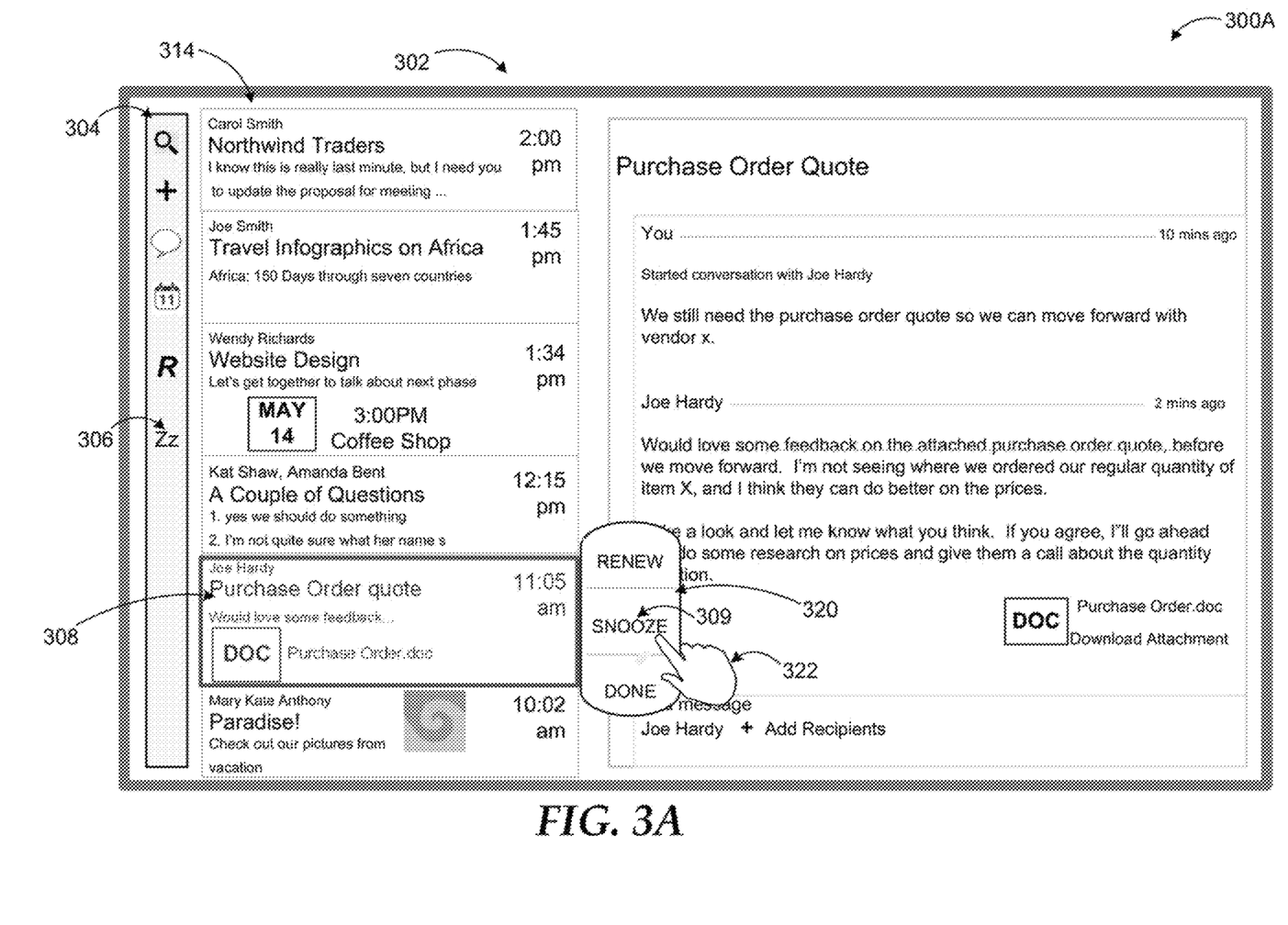
FIGS. 3A and 3B illustrate an example snooze action of a communication application.
Figure 3B:
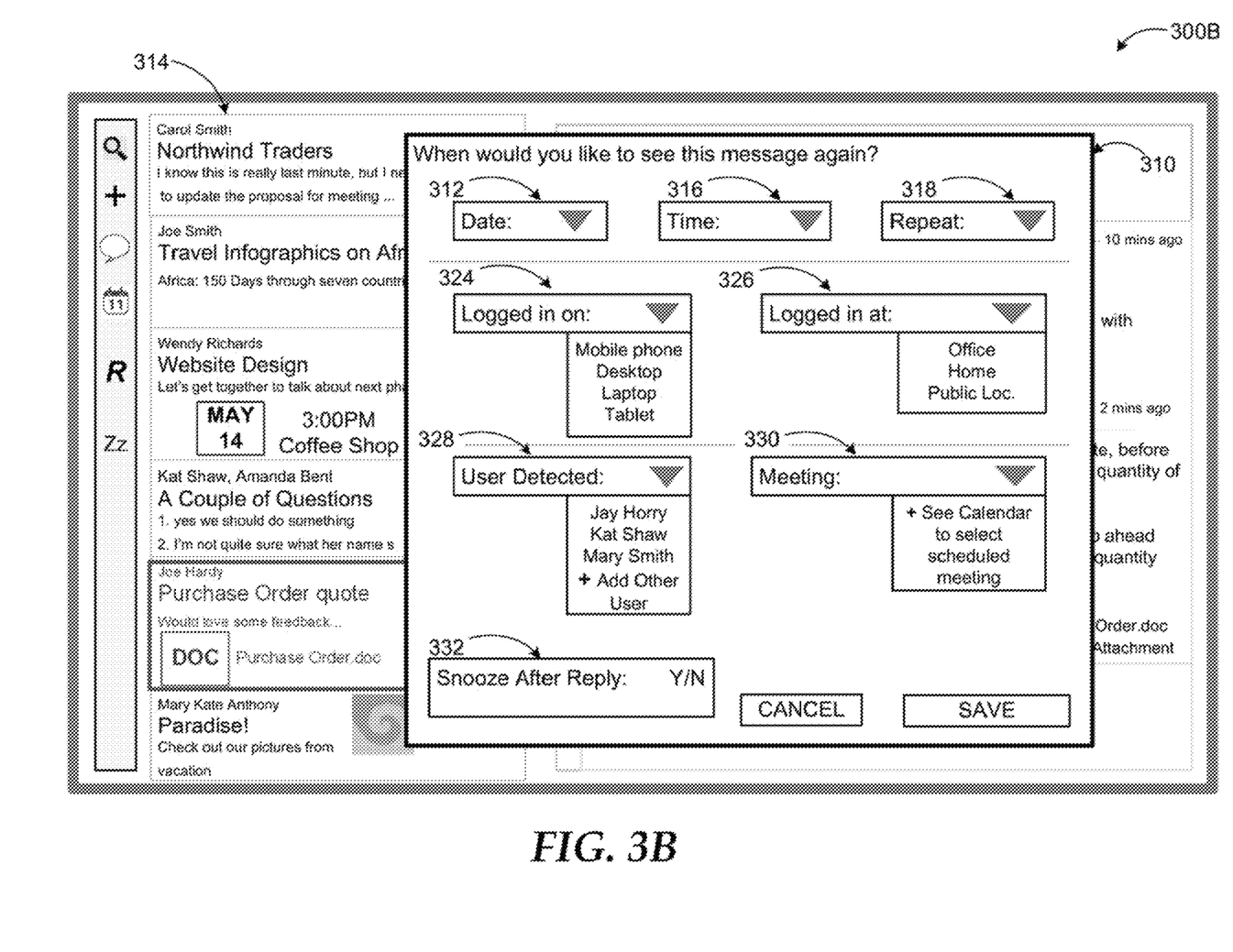

FIGS. 3A and 3B illustrate an example snooze action of a communication application, according to sonic example embodiments.

As previously described, a user may desire to organize messages displayed in a communication application 302 so that the user may view certain messages at certain defined times. For example, the user may desire to view work messages only during business hours or while at the office, and to receive personal and entertainment messages when at home and during evening non-business hours. The user may also desire to hide or minimize a message if the user does not have time to read the message, or wishes to wait to read it until the user is on a different computing device, near somebody with whom they need to discuss a message, in a meeting relevant to the message, or in a different location, or other similar reason. The user may select a snooze option to cause the message to be displayed at a later time based on a detected criteria selected by the user.

As illustrated in diagram 300A, a user may select a message 308 from an inbox 314 list of messages that the user may desire to hide or minimize the message 308 until a later time. For example, the user may wish to hide the message 308 if the user does not have time to read it currently or the user wants to read it on a different device, or other similar scenario. The user may select the message 308 employing a touch action 322 such as a tap and hold, and a popup pane 320 may appear with a list of actions that may be executed on the selected message. A snooze action 309 may be presented on the list of actions on the pane 320, and the user may perform a gesture to select the snooze action 309. For example, the user may drag the message over the snooze action 309 or tap the snooze action 309 while the message is selected. Other traditional input actions such as mouse, stylus and keyboard entries may also be utilized to select to snooze the message.

In another embodiment, a snooze option 306 may be presented on a toolbar 304, and the user may select a message and perform an action to select the snooze option 306 from the toolbar 304, such as tapping and holding the message to select the message, and dragging the message over the snooze option 306, or tapping the snooze option 306 on the toolbar 304 while the message is selected. Furthermore, when the user hovers over an email, a snooze icon may be temporarily displayed next to the message to enable the user to select the icon to snooze the email.

As illustrated in diagram 300B, after the snooze action has been selected to hide the selected message, a pane 310 may be displayed to provide a number of snooze options. The user may select to see the message based on a variety of criteria such as a different time and date, when the user is at a different location, when the user is logged in on a different device, when a certain user is detected, when the user is in a particular meeting, or other similar situation.

The list of snooze options may display a variety of different drop-down or write-in menus for enabling the user to select the snooze time. For example, the user may select the date 312 and time 316 to redeliver the message, and the user may also select a number of times and how often the message should be redelivered/displayed by selling a repeat 318 option. The user may select the message to be redelivered/displayed when the system detects the user is on a particular type of device 324. For example, the user may initially receive the message on the user's smart phone, and the user may snooze the email until the system detects the user is at a computing device such as a desktop or laptop. The snooze option may also be user 328 based, such that the user may select to snooze the message and resend the message next time the user is with a selected user or the selected user is logged in and able to receive messages. The user may be determined to be with the selected user based on presence detection, or the system may identify that the user is on a conference call or in a meeting with the selected user, and may redeliver the message.

Furthermore, the snooze option may be location 326 based, such that the user may select to snooze a message until the user is in a certain location such as a public location at home, or in the office. Additionally, the user may snooze a message to a specific meeting 330 or conference call. For example, the user may want to be reminded to talk about a particular message during the meeting or conference call, and the user may select to redeliver the message during the call or meeting to remind the user of the message. Another example may be to snooze the email based on received replies 332. The user may select to resend the message if a reply has not been sent within a defined period of time, e.g. within 48 hours of the initial receipt of the message. In another example, the user may customize the snooze option to select to resend the message unless a reply to the message has been sent by the user or another related message from another user has been received, so it may not be necessary to alert the user again about the message.

In an example embodiment, when a message has been snoozed, the message may become hidden from the inbox 314 of messages so the user can view and focus on other messages. When the message is redelivered, the message may preserve the original timestamp, and may receive a new timestamp at the time of redelivery. Additionally, the inbox 314 may display snoozed items in a snooze section above the inbox 314. For example, the user may scroll down to view messages received in the past, and the user may scroll up to view items that have been snoozed to a future time.

In another embodiment, the system may display time estimates for messages to provide an indication of a likely time it may take a user to read a message. For example, the system may parse received messages, and perform a word count and/or identify attachments to determine that a message may take a longer amount of time for the user to process, such as more than two minutes per message. A notification may be provided such as a popup window or icon indicating that the message may take the user a longer time to process, and the user may decide to snooze the message to a later time based tin the time indication. Additionally, the system may automatically snooze a message until a later time based on the estimated time that it may take a use to read a message based on user defined settings. For example, the user may create a setting to automatically snooze any message with a word count over 400 words or that contains attachments to a specified time. In another embodiment, the system may observe user behavior to identify how a user addresses messages from certain senders, with particular subjects, different content, and varying lengths. Based on observed behaviors, the system may automatically choose to snooze certain messages to alternative times. Furthermore, the user may choose to snooze a message until the user has free time in his schedule to address the message, and the system may consult the user's calendar and automatically choose a time to resend the message based on an identified free timeslot in the user's calendar.

Figure 4A:
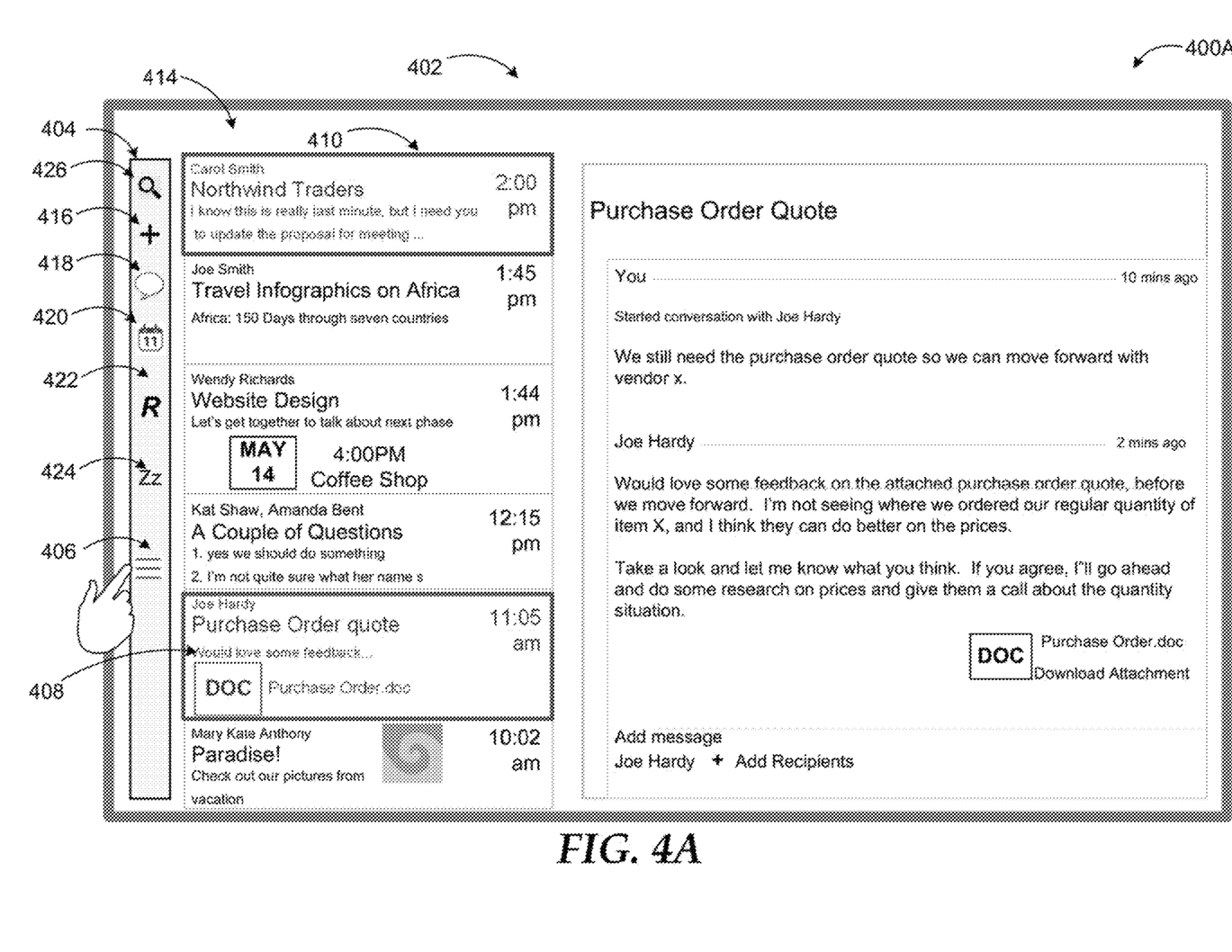
FIGS. 4A and 4B illustrate an example quick toolbar and stack action.
Figure 4B:
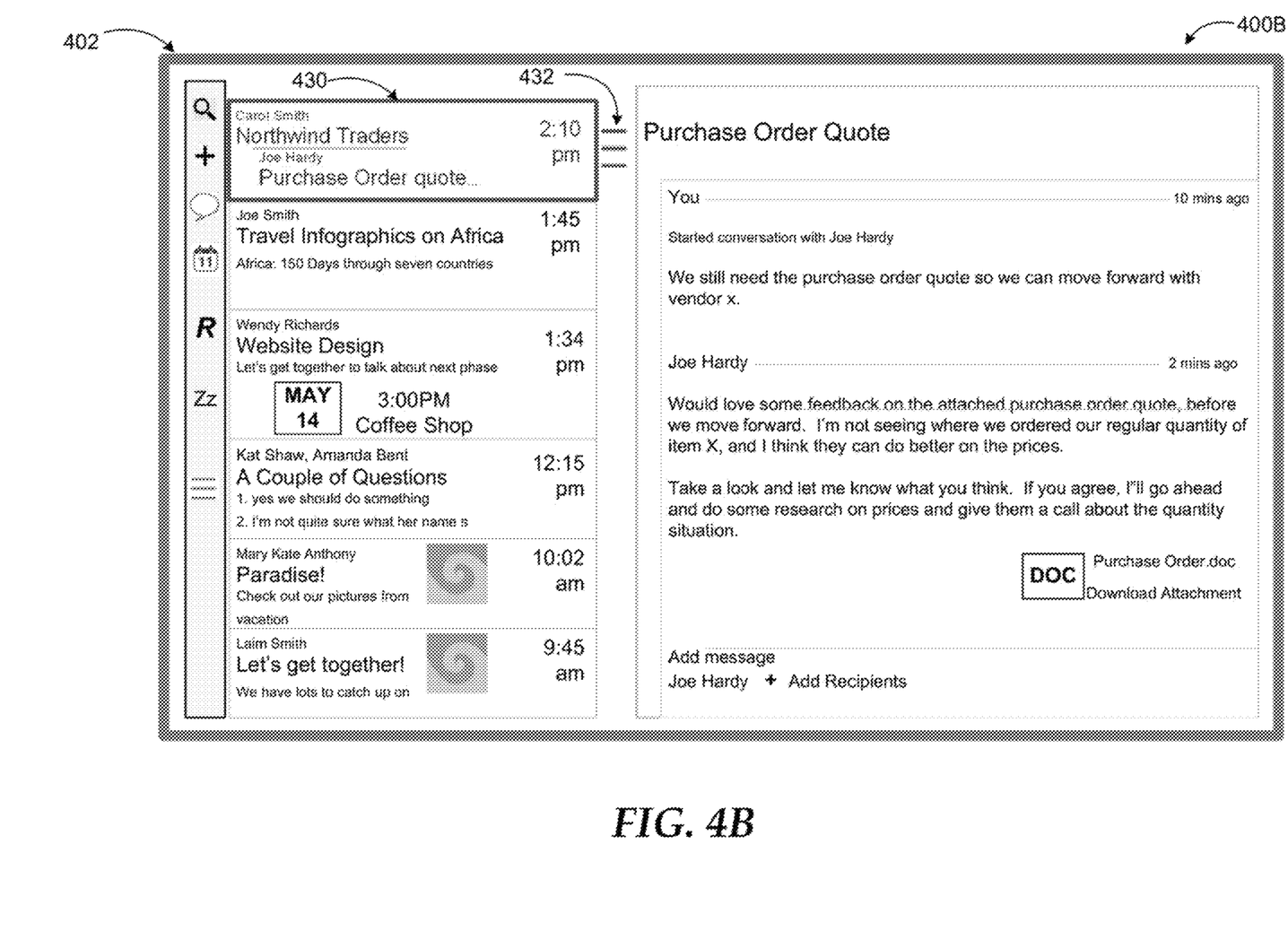

FIGS. 4A and 4B illustrate an example quick toolbar and stack action, according to some example embodiments.

As previously described, a toolbar 404 may be provided with the communication application 402 to enable quick actions to be taken. As illustrated in diagram 400A, in addition to a renew action 422 and a snooze action 424 displayed on the toolbar 404 as previously described, the toolbar 404 may also display other actions. Some additional actions may be to create new messages 416, search 426 for content such as messages, events, and contacts using keywords, schedule events 420 associated with a calendar application, initiate an instant messaging 418 session or video conferencing session, a stack action 406, and other similar actions. The user may customize the quick actions that may be displayed on the toolbar 404 to display more, less or other actions the user prefers.

In an example embodiment, the stack action 406 may be selected to associate two or more messages (410,408) together and to display the messages together, or stack the messages, in the inbox. For example, a user may select two or more messages (410,408) concurrently from the inbox, and may select the stack action 406 from the quick toolbar 404. As illustrated in diagram 400B, the messages may be grouped or stacked 430 together under the most recently received message so that the messages appear and flow together in the inbox 414. A stack indicator 432 may be displayed next to the stacked messages to enable the user to quickly scan the inbox and identify a group of stacked 430 messages. While the example in diagram 400B shows stacking of email messages, other conversations can be stacked also, such as instant messages, recorded phone or video conversations, and the like.

The examples described above in FIG. 2 through 4 are shown with specific components, visualizations, and configurations. Embodiments are not limited to systems according to these example visualizations and configurations. Providing a system facilitating prioritization and management of conversations in a communication application 402 may be implemented in configurations employing fewer or additional components in applications and user interfaces. Furthermore, while the examples have been described in the context of messages, conversations such as emails, instant messages, and recorded audio and video conversations may be organized, prioritized, and arranged with similar actions as described above.

Figure 5:
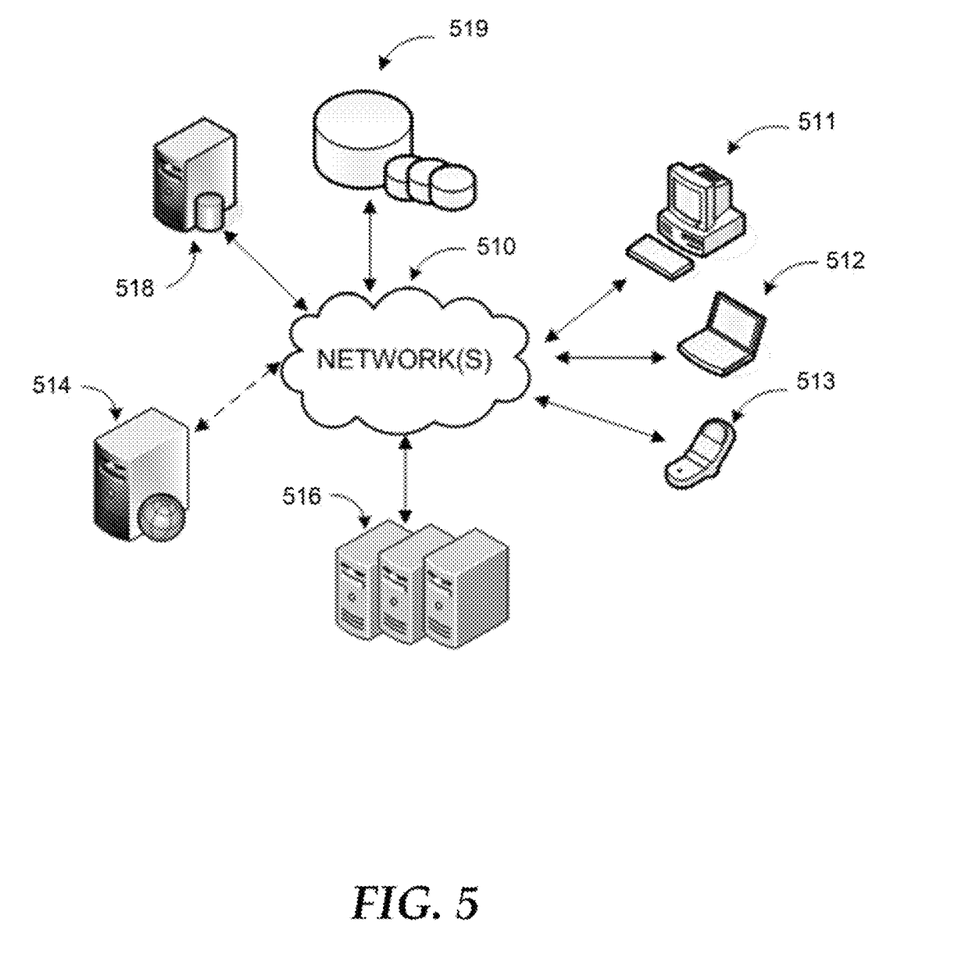
FIG. 5 is a networked environment, where a system according to embodiments may be implemented.

FIG. 5 is an example networked environment, where embodiments may be implemented. A system for a system to facilitate prioritization and management of conversations may be implemented via software executed over one or more servers 514 such as a hosted service. The platform may communicate with client applications on individual computing devices such as a smart phone 513, a laptop computer 512, or desktop computer 511 ('client devices') through network(s) 510.

Client applications executed on any of the client devices 511-513 may facilitate communications via application(s) executed by servers 514, or on individual server 516. An application executed on one of the servers may facilitate organizing and prioritizing conversations. The application may retrieve relevant data from data store(s) 519 directly or through database server 518, and provide requested services (e.g. document editing) to the user(s) through client devices 511-513.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to implement a platform for providing a system facilitating organization and prioritization of conversations. Furthermore, the networked environments discussed in FIG. 5 are for illustration purposes only. Embodiments are not limited to the example applications, modules, or processes.

Figure 6:
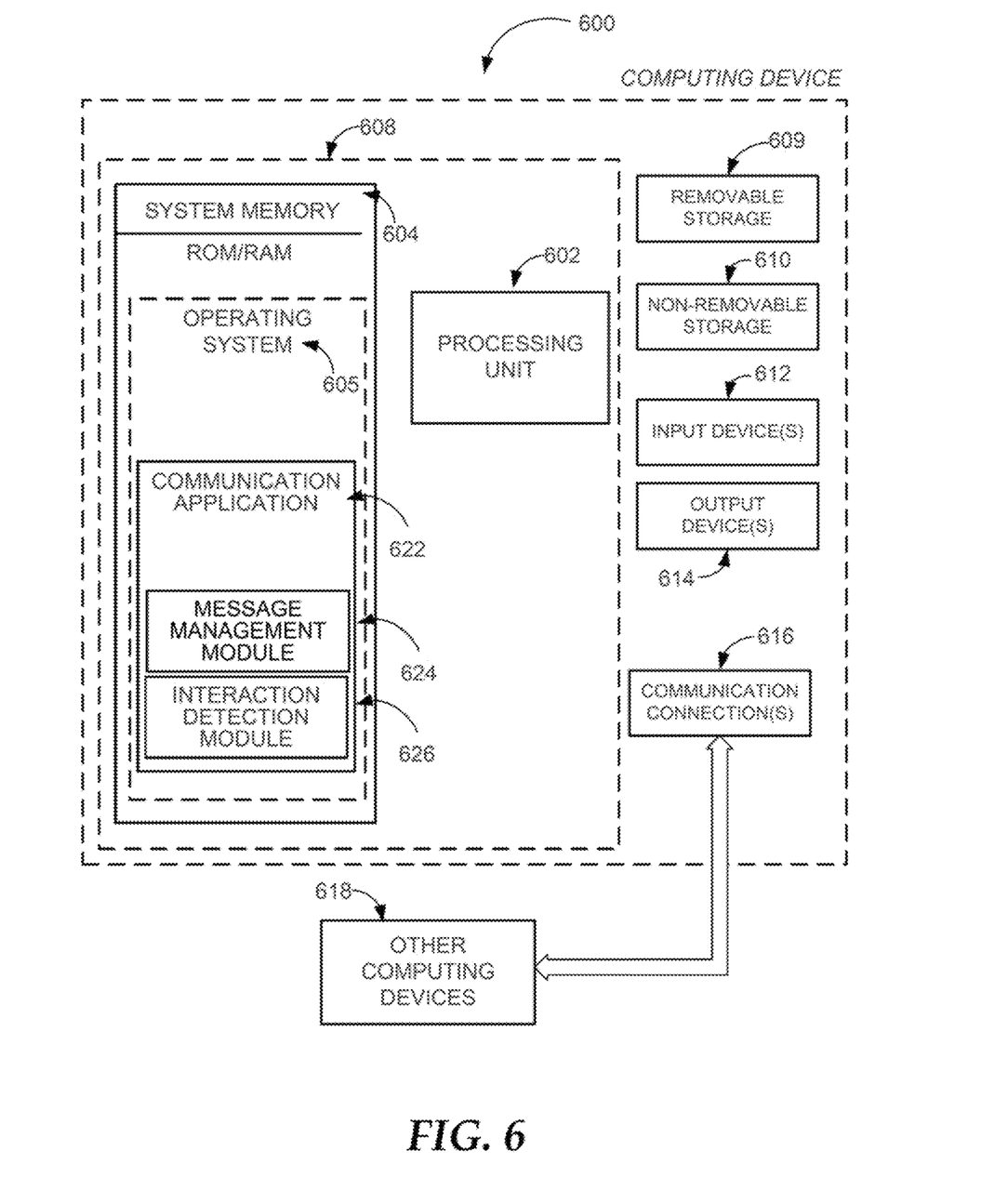
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment for an application according to embodiments is illustrated, such as computing device 600. In a basic configuration, computing device 600 may be any computing device executing an application for providing a system to facilitate organization and prioritization of conversations according to embodiments and include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the platform, such as the WINDOWS® operating systems from MICROSOFT CORPORATION of Redmond, Wash. The system memory 604 may also include one or more software applications such as communication application 622, a message management module 624, and an interaction detection module 626.

Communication application 622 may facilitate conversation exchange including emails, instant messages, and audio/video conferencing while a message assistant module 624 enables organization and prioritization of received messages based on user interaction. The message management module 624 may determine user intention based on detected user interaction at the interaction detection module 626 for actions to be taken on a selected one or more messages. The message management module 624 may automatically perform some actions based on detected user behavior and may provide indications to the user to enable the user to take actions based on the provided indications. The communication application 622, message management module 624, and interaction detection module 626 may be separate applications or integrated modules of a hosted service. For example, communication application 622 may be a browser accessing as email service and may be integrated with other content sharing applications such as instant messaging applications, video conferencing applications, and calendar applications. This basic configuration is illustrated in FIG. 6 by those components within dashed line 608.

Computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 600. Any such computer readable storage media may be part of computing device 600. Computing device 600 may also have input devices(s) 612 such as keyboard, mouse, pen, voice input device, touch input device, and comparable input devices. Output device(s) 614 such as a display, speakers, printer, and other types of output devices may also be included. These devices are well known in the art and need not be discussed at length here.

Computing device 600 may also contain communication connections 616 that allow the device to communicate with other devices 618, such as over a wired or wireless network in a distributed computing environment, a satellite link, a cellular link, a short range network, and comparable mechanisms. Other devices 618 may include computer devices(s) that execute communication applications, web servers, and comparable devices. Communication connection(s) 616 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 7:
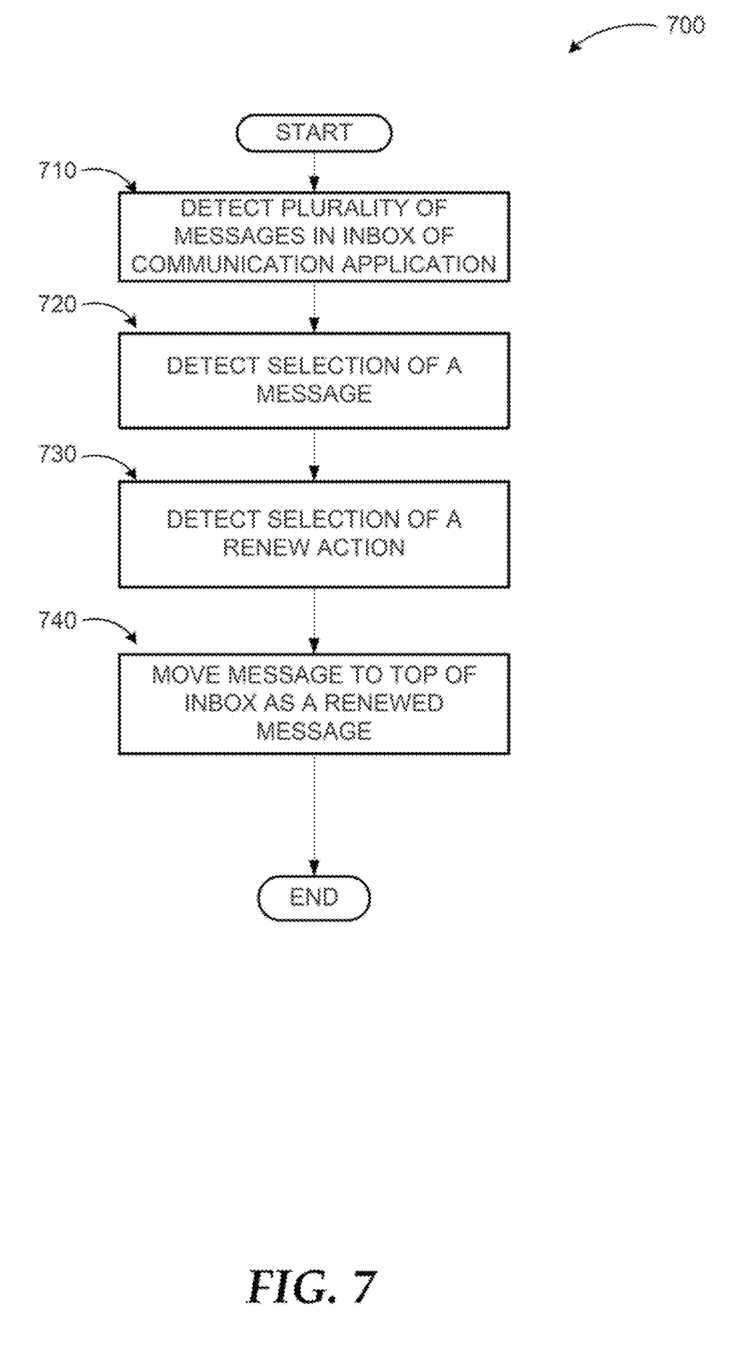
FIG. 7 illustrates a logic flow diagram for a process of providing a system to facilitate managing conversations in a communication application, according to embodiments.

FIG. 7 illustrates a logic flow diagram for process 700 of providing a system for prioritizing and managing conversations in a communication application, according to embodiments. Process 700 may be implemented on a computing device or similar electronic device capable of executing instructions through a processor.

Process 700 begins with operation 710, where a plurality of messages received through a communication application may be detected. Operation 710 may be followed by operation 720 wherein a selection of a message from the plurality of messages displayed in an inbox of the communication application may be detected. The message may be selected employing touch and gesture input as well as through mouse, stylus and keyboard input.

Operation 720 may be followed by operation 730 where a selection of a renew action associated with the selected message may be detected. The renew action may be presented in a popup pane, and in other embodiments the renew action may be presented on a toolbar including actions for interacting with the communication application.

Operation 730 may be followed by operation 740 where the selected message may be displayed as a renewed message at the top of inbox. The renewed message may receive a new timestamp while preserving the original timestamp, and a renew indicator may be displayed adjacent to the renewed message.

The operations included in process 700 are for illustration purposes. Providing a system for management of conversations in a communication application may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed in a computing device for managing conversations in a communication application, the method comprising:
   detecting activation of a renew action associated with a message selected among a plurality of messages displayed in a chronological order on a user interface of the communication application;
   enabling display of the selected message as a renewed message at a top most recent position of the chronological order, wherein a read state of the selected message is maintained in the renewed message, and an original header and a body of the selected message is preserved in the renewed message without an insertion of a forward header to the selected message;
   in response to receiving a new message in the communication application, determining whether a predefined period of time has expired;
   when the predefined period of time has expired, enabling display of the new message in the top most recent position of the chronological order and enabling display of the renewed message in a second most recent position of the chronological order below the top most recent position of the chronological order; and
   when the predefined period of time has not expired, maintaining the renewed message at the top most recent position of the chronological order and enabling display of the new message in the second most recent position of the chronological order.

2. The method of claim 1, further comprising;
   enabling display of a list of selectable actions to be performed on a displayed message, the selectable actions including one or more of: the renew action, a done action, and a snooze action.

3. The method of claim 1, wherein detecting the activation of the renew action associated with the selected message further comprises:
   detecting selection of a renew option displayed on a toolbar provided on the user interface of the communication application.

4. The method of claim 3, wherein detecting selection of the renew option displayed on the toolbar further comprises one of:

detecting a touch interaction on the renew option while the message is selected; and detecting a drag and drop of the selected message over the renew option on the toolbar.

5. The method of claim 1, further comprising:

automatically renewing a message based on an identified pattern of user behavior including one or more of: detection of a draft reply, detection of reading of the message, detection of an expected reply message not being received.

6. The method of claim 1, further comprising:

detecting selection of one or more messages on a user interface of the communication application;

detecting activation of a done action displayed on one of: a popup pane and a toolbar; and one of hiding and minimizing the one or more selected messages on the user interface.

7. The method of claim 1 further comprising:

allowing sorting of the messages based on original timestamps and renewed timestamps.

8. A computing device for managing conversations, the computing device comprising:

a memory;

a display; and a processor coupled to the memory and the display, the processor configured to provide a user interface associated with a communication application, wherein the communication application is configured to:

detect activation of a renew action associated with a message selected among a plurality of messages displayed in a chronological order on the user interface of the communication application;

enable display of the selected message as a renewed message at a top most recent position of the chronological order, wherein a read state of the selected message is maintained in the renewed message, and an original header and a body of the selected message is preserved in the renewed message without an insertion of a forward header to the selected message; and in response to receiving a new message in the communication application, determine whether a predefined period of time has expired;

when the predefined period of time has expired, enable display of the new message in the top most recent position of the chronological order and enable display of the renewed message in a second most recent position of the chronological order; and when the predefined period of time has not expired, maintain the renewed message at the top most recent position of the chronological order and enable display of the new message in the second most recent position of the chronological order.

9. The computing device of claim 8, wherein the communication application is further configured to enable display of a list of selectable actions upon detection of the selection of the message, the selectable actions including one or more of: the renew action, a done action, and a snooze action.

10. The computing device of claim 9, wherein the communication application is further configured to:

enable display of a list of snooze options upon detection of activation of the snooze action associated with the selected message.

11. The computing device of claim 10, wherein the list of snooze options includes one or more of: a device based option, time estimation based option, a user behavior based option, and a user based option.

12. The computing device of claim 11, wherein the device based option includes an identification of a particular type of computing device associated with a user for the snooze action to be activated.

13. The computing device of claim 11, wherein the time estimation based option includes an automatic determination of exceeding of a predefined limit on word count in the message for the snooze action to be activated.

14. The computing device of claim 11, wherein the user based option includes an automatic identification of behavior associated with how a user addresses received messages based on a particular subject and a particular length of each message.

15. The computing device of claim 11, wherein the user based option includes an identification of logging in of the recipient of the message.

16. The computing device of claim 8, wherein the communication application is further configured to enable display of a toolbar including one or more quick actions for interacting with the communication application, the one or more quick actions including at least one of: the renew action, a snooze action, a create new message action, a search action, a scheduler action, an instant messaging initiation action, and a stack action.

17. A method for managing conversations in a communication application, the method comprising:

enabling display of a toolbar of a user interface of the communication application, wherein the toolbar includes one or more quick actions for interacting with the communication application, the one or more quick actions including a renew action, a snooze action, a create new message action, a search action, a scheduler action, and an instant messaging initiation action;

detecting activation of the snooze action associated with a message selected among a plurality of messages displayed on the user interface of the communication application in a chronological order;

enabling display of a list of snooze options associated with the selected message, wherein the list of snooze options includes at least enabling display of the selected message when the recipient is with a selected user;

hiding the selected message; and enabling display of the selected message again based on one or more selected snooze options from the list of snooze options, wherein the list of snooze options further includes enabling display of the selected message based on a determination of a number of times and an interval for the snooze action to be activated, enabling display of the selected message when the recipient of the message is logged in, and enabling display of the selected message during a free timeslot in a calendar of the recipient of the message.

18. The method of claim 17, wherein the list of snooze options further includes enabling display of the selected message at a date and a time specified by the recipient.

19. The method of claim 17, wherein hiding the selected message comprises: one of removing the selected message from the user interface of the communication application and minimizing the message on the user interface of the communication application.

* * * * *